(12) United States Patent
Suzuki et al.

(10) Patent No.: US 8,422,157 B2
(45) Date of Patent: Apr. 16, 2013

(54) MAGNETIC TRANSFER DEVICE AND MAGNETIC DISK MEDIUM HAVING SECTORS WITH SHIFT ASSOCIATED WITH DETERMINATION TARGET INFORMATION

(75) Inventors: Hiroyuki Suzuki, Oume (JP); Hiroshi Kubota, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 13/251,068

(22) Filed: Sep. 30, 2011

(65) Prior Publication Data
US 2012/0162802 A1 Jun. 28, 2012

(30) Foreign Application Priority Data

Dec. 24, 2010 (JP) .................. 2010-288458

(51) Int. Cl.
*G11B 5/86* (2006.01)
*G11B 5/09* (2006.01)

(52) U.S. Cl.
USPC ........................... 360/15; 360/48; G9B/5.308

(58) Field of Classification Search ........................ None
See application file for complete search history.

(56) References Cited

U.S. PATENT DOCUMENTS

| 4,833,551 | A | 5/1989 | Song |
| 6,118,609 | A * | 9/2000 | Gong .............................. 360/61 |
| 6,748,865 | B2 | 6/2004 | Sakurai et al. |
| 6,775,080 | B2 * | 8/2004 | King et al. ..................... 360/48 |
| 7,061,702 | B2 | 6/2006 | Yoshimura et al. |
| 7,529,051 | B2 * | 5/2009 | Hanson et al. .................. 360/51 |
| 2003/0161067 | A1 * | 8/2003 | Ramler et al. ............. 360/77.05 |
| 2004/0201912 | A1 | 10/2004 | Tsubata |

FOREIGN PATENT DOCUMENTS

| JP | 63-209078 | 8/1988 |
| JP | 2003-157520 | 5/2003 |
| JP | 2004-213700 | 7/2004 |
| JP | 2004-318946 | 11/2004 |

* cited by examiner

*Primary Examiner* — Daniell L Negron
(74) *Attorney, Agent, or Firm* — Knobbe Martens Olson & Bear LLP

(57) ABSTRACT

According to one embodiment, a magnetic disk medium is pre-formatted on both the surfaces by magnetic transfer. Sectors with the same sector number on the front surface and the rear surface of the magnetic disk medium are arranged at positions shifted by a predetermined angle associated in advance with determination target information.

11 Claims, 8 Drawing Sheets

| VERSION | 0 | 1 | 2 | 3 | 4 | 5 | 6 | 7 | 8 | 9 |
|---|---|---|---|---|---|---|---|---|---|---|
| SECTOR OFFSET VALUE | 5 | 15 | 25 | 35 | 45 | 55 | 65 | 75 | 85 | 95 |

| SECTOR OFFSET DETECTED VALUE | 0-9 | 10-19 | 20-29 | 30-39 | 40-49 | 50-59 | 60-69 | 70-79 | 80-89 | 90-99 |
|---|---|---|---|---|---|---|---|---|---|---|
| VERSION DETERMINATION | 0 | 1 | 2 | 3 | 4 | 5 | 6 | 7 | 8 | 9 |

(a) FRONT SURFACE   (b) REAR SURFACE

SECTOR NUMBER=0   SECTOR NUMBER=60

MAGNETIC TRANSFER DEVICE AND MAGNETIC DISK MEDIUM HAVING SECTORS WITH SHIFT ASSOCIATED WITH DETERMINATION TARGET INFORMATION

CROSS-REFERENCE TO RELATED APPLICATIONS

This application is based upon and claims the benefit of priority from Japanese Patent Application No. 2010-288458, filed Dec. 24, 2010, the entire contents of which are incorporated herein by reference.

FIELD

Embodiments described herein relate generally to a magnetic disk medium and a magnetic transfer device.

BACKGROUND

Generally, in a magnetic disk recording apparatus using a magnetic disk medium, signals such as servo signals to position tracks on which a variety of information is recorded, address signals to identify the tracks, and reproduction clock signals need to be reproduced even if no data is recorded. Accordingly, to enable reproduction of such signals, pre-formatting is performed at the time of manufacturing the magnetic disk medium.

To perform pre-formatting accurately with high efficiency, a magnetic transfer method is widely known in which magnetic patterns that are carried on master media are then transferred onto magnetic disk media.

A magnetic transfer device that performs magnetic transfer simultaneously on both surfaces of a magnetic disk medium has a pair of holders to hold the master media such that the magnetic disk medium is tightly sandwiched between those master media. Then, by applying a transfer magnetic field, a servo pattern is transferred onto the magnetic disk medium and thus pre-formatting is performed.

In a pre-formatted magnetic disk medium manufactured in the abovementioned manner, it is ensured that sector forming positions (and sector numbers) on the front surface match sector forming positions (and sector numbers) on the rear surface.

Meanwhile, in the manufacturing management of pre-formatted magnetic disk media in the conventional magnetic transfer device as described above, if error analysis or quality control is to be performed for each transfer condition, each magnetic disk medium needs to be identified on a transfer condition basis. However, since all manufactured magnetic disk media have the same structure, it is not an easy task to identify each magnetic disk medium. Particularly, once the magnetic disk medium is installed in a magnetic disk device, error analysis performed in association with the transfer conditions requires identifying means of some kind separately. For example, as such identifying means, a database may be build in which the magnetic disk device and the magnetic disk medium are associated with each other, an identification code may be assigned to each magnetic disk medium, or the like. In any case, such means lead to an increase in the manufacturing cost.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a magnetic disk medium is configured to be pre-formatted on both the surfaces by magnetic transfer. Sectors with the same sector number on the front surface and the rear surface of the magnetic disk medium are arranged at positions shifted by a predetermined angle associated in advance with determination target information.

Figure 1:
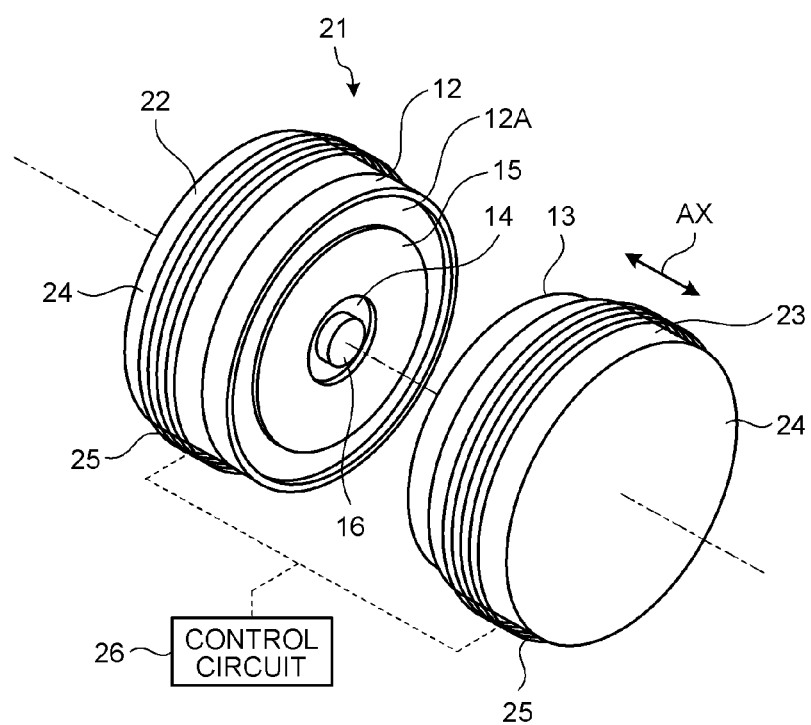
FIG. 1 is an exemplary first schematic perspective view for explaining a magnetic transfer device according to a first embodiment.
Figure 2:
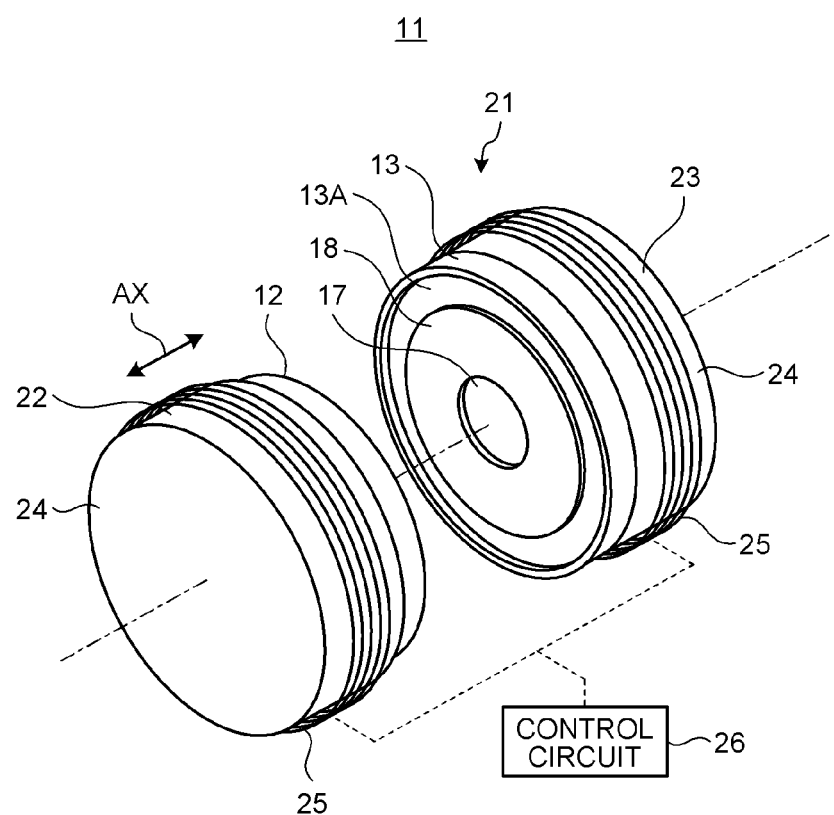
FIG. 2 is an exemplary second schematic perspective view for explaining the magnetic transfer device in the first embodiment.

FIG. 1 is a first schematic perspective view for explaining a magnetic transfer device 11 according to a first embodiment. FIG. 2 is a second schematic perspective view for explaining the magnetic transfer device 11. The magnetic transfer device 11 comprises a substantially columnar first transfer holder 12 and a substantially columnar second transfer holder 13, which are made of nonmagnetic material. The first transfer holder 12 has a master medium holding surface 12A for holding a first master medium 15, while the second transfer holder 13 has a master medium holding surface 13A for holding a second master medium 18.

In the magnetic transfer device 11, the first transfer holder 12 and the second transfer holder 13 are held such that the master medium holding surfaces 12A and 13A face each other. In this case, the master medium holding surfaces 12A and 13A are arranged, for example, along a vertical plane perpendicular to the floor.

In the first transfer holder 12, a master medium bore shaft 14 is installed in a protruding manner on the master medium holding surface 12A. To the master medium bore shaft 14 is attached the first master medium 15. On the first transfer holder 12, a mark or a gauge is put to indicate a reference position for attaching the first master medium 15.

A reference attachment position mark put in advance on the first master medium 15 is made to align with the mark or the gauge put on the first transfer holder 12 to indicate the reference attachment position. With this, the first master medium 15 is attached in a predetermined state to the first transfer holder 12.

In this case, the reference attachment position mark put on the first master medium 15 represents, for example, a planned position for forming a sector having a predetermined sector number. The predetermined state of the first master medium 15 indicates either the state where the reference positions are in alignment or the state where the reference positions are shifted by a predetermined angle or by a predetermined number of sectors.

The first master medium 15 comprises a master medium main-body made of a nonmagnetic material and a magnetic pattern arranged on the front side of the master medium main-body. Herein, the magnetic pattern reflects the shape of a servo pattern established on one of the surfaces (in the first embodiment, the rear surface) of a magnetic disk medium 31. More specifically, the magnetic pattern constituting the first master medium 15 reflects the shape of a servo pattern established in a servo sector area on the rear surface of the magnetic disk medium 31 (see FIG. 3), which serves as a magnetic transfer target as described later.

On the master medium bore shaft 14 is formed a magnetic disk bore shaft 16, on which the magnetic disk medium 31 serving as a magnetic transfer target as described later is attached and held. The magnetic disk bore shaft 16 is made of, for example, a soft magnetic material. The shaft center of the master medium bore shaft 14 corresponds to that of the magnetic disk bore shaft 16. In this way, on the front surface of the first master medium 15 is superposed the rear surface of the magnetic disk medium 31.

As illustrated in FIG. 2, in the second transfer holder 13, a master medium bore shaft 17 is installed in a protruding manner on the master medium holding surface 13A. To the master medium bore shaft 17 is attached the second master medium 18. On the second transfer holder 13, a mark or a gauge is put to indicate a reference position for attaching the second master medium 18. A reference attachment position mark put in advance on the second master medium 18 is made to align with the mark or the gauge put on the second transfer holder 13 to indicate the reference attachment position. With this, the second master medium 18 is attached in a predetermined state to the second transfer holder 13. The predetermined state of the second master medium 18 indicates either the state where the reference positions are in alignment or the state where the reference positions are shifted by a predetermined angle or by a predetermined number of sectors.

The second master medium 18 faces the first master medium 15. The shaft center of the master medium bore shaft 14 of the first transfer holder 12 corresponds to that of the master medium bore shaft 17 of the second transfer holder 13. The diameter of the second master medium 18 is set to be identical to that of the first master medium 15.

As with the first master medium 15, the second master medium 18 also comprises a master medium main-body made of a nonmagnetic material and a magnetic pattern arranged on the front side of the master medium main-body. Herein, the magnetic pattern reflects the shape of a servo pattern established on the other of the surfaces (in the first embodiment, the front surface) of the magnetic disk medium 31. More specifically, the magnetic pattern constituting the second master medium 18 reflects the shape of a servo pattern established in a servo sector area on the front surface of the magnetic disk medium 31 (see FIG. 3) serving as a magnetic transfer target as described later.

Described below is the relationship of the attached state of the first master medium 15 with respect to the first transfer holder 12 as well as that of the second master medium 18 with respect to the second transfer holder 13 with the servo patterns (particularly, sector arrangement) that are formed.

In the first embodiment, if the first master medium 15 or the second master medium 18 is replaced or magnetic transfer conditions (magnetic flux density, magnetic transfer time, etc.) are changed, version management is performed to enable error analysis or quality control. That is, each time the magnetic transfer conditions are changed, management is performed after changing the version.

To determine the version, the sectors having the same sector number on the front and rear surfaces of the magnetic disk medium 31 are arranged at positions shifted by a predetermined angle. Alternatively, the sectors are formed in a mirror symmetrical manner on the front and rear surfaces of the magnetic disk medium 31, and the sector numbers of the sectors formed at the same positions are shifted by a predetermined number of sector positions.

Figures 3, 4:
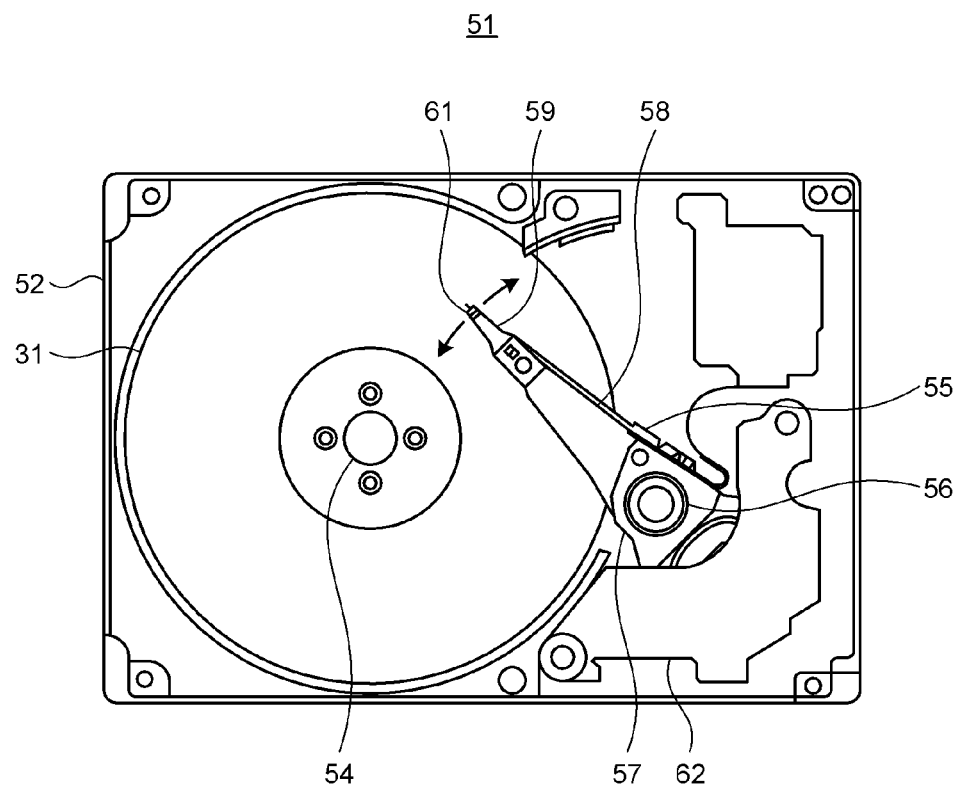
FIG. 3 is an exemplary diagram for explaining the setting of sector offset values in the first embodiment.
FIG. 4 is an exemplary diagram for explaining a magnetic disk device having a magnetic disk medium installed therein in the first embodiment.

FIG. 3 is a diagram for explaining the setting of sector offset values. The following explanation is given for an exemplary case in which sectors having the same sector number on the front and rear surfaces of the magnetic disk medium 31 are arranged at positions shifted by a predetermined angle, and version management is performed for a total of 10 versions from version 0 to 9 as illustrated in FIG. 3.

For example, for version 0, a sector offset value (i.e., the angle by which the sectors are to be shifted) of 5° is set between the front and rear surfaces of the magnetic disk medium 31. Similarly, for version 1, a sector offset value of 15° is set. In the same manner, for version 9, a sector offset value of 95° is set. In this manner, the sector offset values are changed in increments of 10°. Consequently, for example, for version 6, a sector offset value 65° is set. In other words, the first master medium 15 and the second master medium 18 are attached to the first transfer holder 12 and the second transfer holder 13, respectively, such that the amount of shift in the reference positions is 65°.

Figures 5, 6:
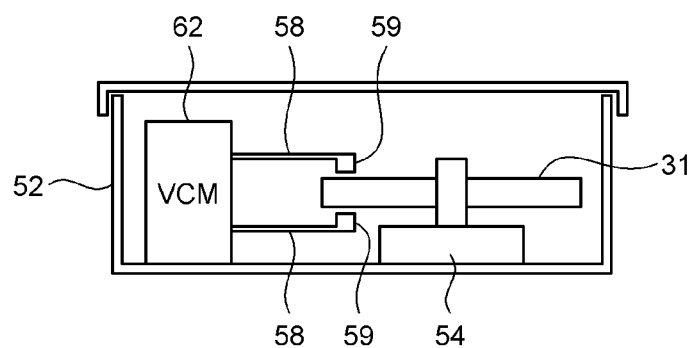
FIG. 5 is an exemplary schematic cross-sectional view of a configuration of the magnetic disk device in the first embodiment.
FIG. 6 is an exemplary diagram for explaining the setting of sector offset ranges in the first embodiment.

Described below is a magnetic disk device in which the magnetic disk medium 31 of the first embodiment is installed. FIG. 4 is a diagram for explaining a magnetic disk device having the magnetic disk medium 31 installed therein. FIG. 5 is a schematic cross-sectional view of a configuration of the magnetic disk device.

A magnetic disk device 51 comprises a housing main body 52. For the sake of simplicity, it is assumed herein that only the one magnetic disk medium 31 is housed in the housing space inside the housing main body 52. The magnetic disk medium 31 is attached to the rotary shaft of a spindle motor 54.

In the housing space inside the housing main body 52 is also housed a carriage 55, which comprises a carriage block 57 that is rotatably supported by a spindle 56. The carriage block 57 has a pair of carriage arms 58 each being arranged in a substantially parallel fashion with respect to the front and rear surfaces of the magnetic disk medium 31.

At the leading end of each of the carriage arms 58 is attached a head suspension 59, which supports a flying head slider 61 at the anterior end thereof. The flying head slider 61 has a built-in magnetic head (not illustrated).

On the flying head slider 61, a pressing force acts from the corresponding head suspension 59 toward the surfaces of the magnetic disk medium 31. Besides, if the magnetic disk medium 31 is rotated by the spindle motor 54, an air flow generated at the surface of the magnetic disk medium causes a buoyant force to act on the flying head slider 61. As a result, while the magnetic disk medium 31 is rotating, the pressing force from the head suspension 59 and the buoyant force on the flying head slider 61 stay in balance, which keeps the flying head slider 61 flying.

Meanwhile, to the carriage block 57 is connected a voice coil motor (VCM) 62 as the power source. With the operation of the VCM 62, the carriage block 57 can rotate about the spindle 56 as the rotation axis.

Due to the rotation of the carriage block 57, each of the carriage arms 58 and the head suspension 59 swing. While the flying head slider 61 is flying, the carriage arm 58 swings with respect to the spindle 56. As a result, the flying head slider 61 moves across the surfaces of the magnetic disk medium 31 in the radial direction of the magnetic disk medium 31. That enables the magnetic head to read and write information with respect to a plurality of tracks on the magnetic disk medium 31. Moreover, it becomes possible to read sector numbers from a plurality of servo sectors formed on the magnetic disk medium 31.

Hence, to determine the version of the magnetic disk medium 31 installed in the magnetic disk device 51, first, any sector number is read as a reference sector number from one of the surfaces of the magnetic disk medium 31. Then, as a sector offset value, a time period is detected until a sector having the same sector number as the reference sector number is found on the other surface of the magnetic disk medium 31. Subsequently, the version of the magnetic disk medium 31 is determined based on a sector offset range to which the detected sector offset value belongs.

FIG. 6 is a diagram for explaining the setting of sector offset ranges. As illustrated in FIG. 6, if the detected sector offset value is in the sector offset range of 0° to 9°, the version is determined to be version 0. Similarly, if the detected sector offset value is in the sector offset range of 10° to 19°, the version is determined to be version 1. In the same manner, if the detected sector offset value is in the sector offset range of 90° to 99°, the version is determined to be version 9. For example, if the detected sector offset value is 66°, then the version is determined to be version 6.

The explanation given above is for the case where the sectors having the same sector number on the front and rear surfaces of the magnetic disk medium 31 are arranged at positions shifted by a predetermined angle. In contrast, the following explanation is given for the case where sectors are formed at the same position on the front and rear surfaces of the magnetic disk medium 31, but their sector numbers are changed.

Figure 7:
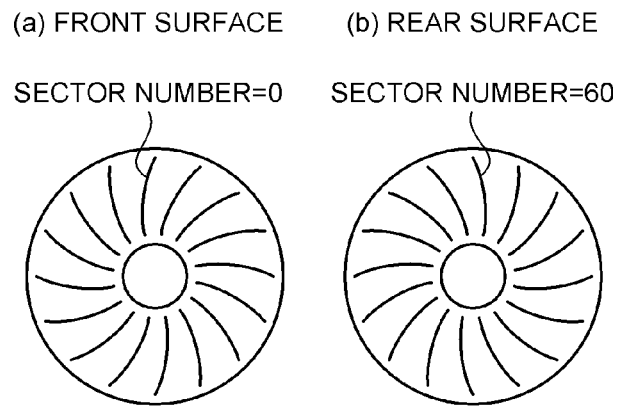
FIG. 7 is an exemplary diagram for explaining the state of sectors formed such that the sector numbers of sectors to be formed at the same positions on the front and rear surfaces of the magnetic disk medium are shifted by a predetermined number in the first embodiment.

FIG. 7 is a diagram for explaining the state of sectors formed such that the sector numbers of the sectors to be formed at the same position on the front and rear surfaces of the magnetic disk medium 31 are shifted by a predetermined number.

For example, assume that, on the front and rear surfaces of the magnetic disk medium 31, the sector numbers of the sectors to be formed at the same position are shifted by (version×10−1). Hence, in the case of version 6, the sector numbers of the sectors to be formed at the same position are shifted by 59. The shift in the sector numbers is herein referred to as "sector offset value".

Hence, as illustrated in FIG. 7, for example, if a sector having the sector number 0 is formed on the front surface of the magnetic disk medium 31, the sector formed on the rear surface has the sector number 60.

Figure 8:
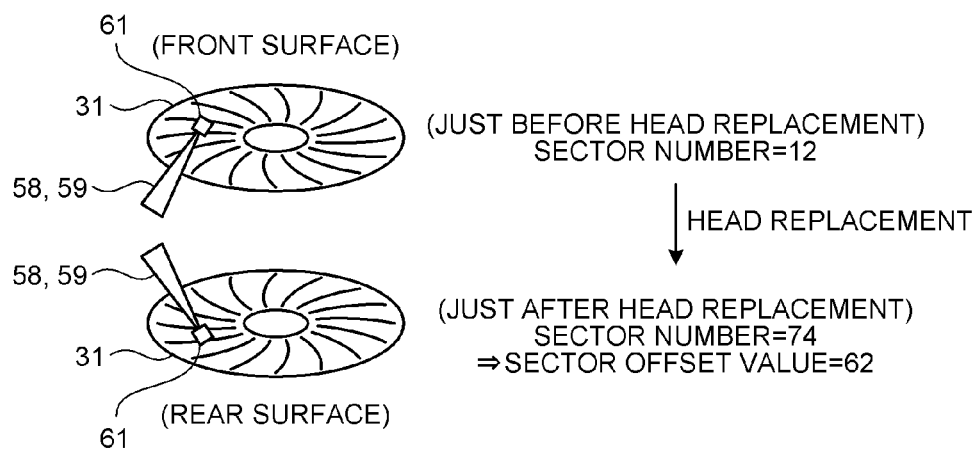
FIG. 8 is an exemplary diagram for explaining the determination of a sector offset number if the sector numbers of sectors to be formed at the same positions on the front and rear surfaces of the magnetic disk medium are shifted by a predetermined number in the first embodiment.

FIG. 8 is a diagram for explaining the determination of a sector offset number if the sector numbers of sectors to be formed at the same position on the front and rear surfaces of the magnetic disk medium 31 are shifted by a predetermined number.

In the magnetic disk device 51, the carriage arms 58, the head suspensions 59, and the flying head sliders 61 (magnetic heads) are arranged in pairs on the front and rear surfaces of the magnetic disk medium 31. If the sector number 12 is read on the front surface of the magnetic disk medium 31, a head is replaced. It is assumed that, as a result of head replacement, the sector number 74 is read on the rear surface of the magnetic disk medium 31. In this way, if the sector offset value indicating the shift in the sector number is 62, the version is determined to be 6 if "angle" in the detected sector offset value is substituted with "sector number".

As described above, according to the first embodiment, by reading sector numbers on the front and rear surfaces of the magnetic disk medium 31 under predetermined conditions, the version can be determined without difficulty by referring to the shift angle or the shift in sector numbers. Thus, it becomes possible to perform error analysis and quality control based on version management.

The version detection is applicable when, as described above, the magnetic disk medium 31 is installed in the magnetic disk device 51. However, even if the magnetic disk medium 31 is taken out of the magnetic disk device 51, the version detection is applicable as long as sector numbers can be read.

Described below is a magnetic transfer operation performed in the case where sectors having the same sector number on the front and rear surfaces of the magnetic disk medium 31 are arranged at positions shifted by a predetermined angle, or sectors are formed in a mirror symmetrical manner on the front and rear surfaces of the magnetic disk medium 31, and the sector numbers of the sectors formed at the same position are shifted by a predetermined number. As illustrated in FIGS. 1 and 2, the first transfer holder 12 and the second transfer holder 13 are provided with a magnetizing mechanism 21.

The magnetizing mechanism 21 comprises a first electromagnet 22 and a second electromagnet 23 that generate a magnetic field in response to the supply of electric currents. The first electromagnet 22 and the second electromagnet 23 have the same configuration, each comprising a magnetic core 24 and a coil 25 that is wound around the magnetic core 24. The first electromagnet 22 and the second electromagnet 23 together generate a magnetic field for performing magnetic transfer.

The magnetizing mechanism 21 generates a magnetic field for performing magnetic transfer under the control of a control circuit 26, which is designed to individually control the magnitude and orientation of electric currents supplied to the first electromagnet 22 and to the second electromagnet 23. More specifically, the control circuit 26 controls the magnitude and orientation of the electric currents according to predetermined control programs, and controls the magnetic field (magnetic field lines) generated for magnetic transfer.

In the magnetic transfer device 11, the first transfer holder 12 and the first electromagnet 22 are installed in a fixed manner. In contrast, the second transfer holder 13 and the second electromagnet 23 are installed to be relatively movable in directions away from and toward the first transfer holder 12 and the first electromagnet 22, respectively. More specifically, the second transfer holder 13 is capable of moving along the shaft center of the master medium bore shaft 17 in the direction indicated by an arrow AX. Such a movement of the second transfer holder 13 is achieved based on, for example, the guidance of a guiding rail (not illustrated).

Figure 9:
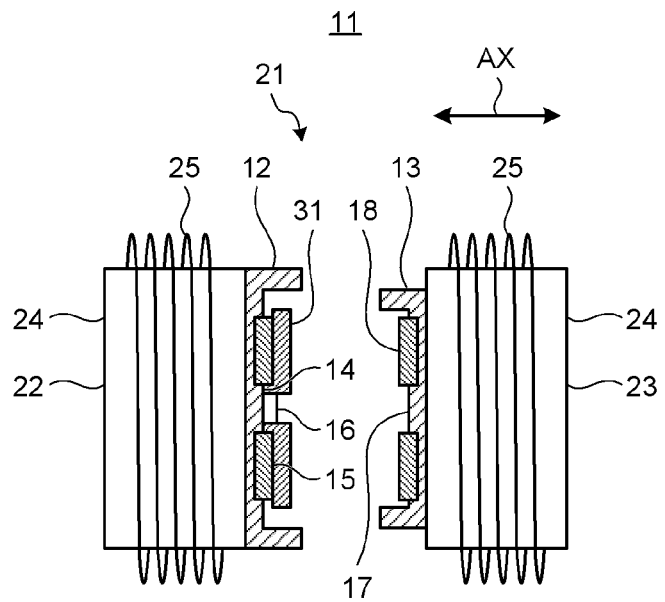
FIG. 9 is an exemplary diagram for explaining a case where the magnetic disk medium to be pre-formatted is installed at a standby position in the magnetic transfer device in the first embodiment.
Figure 10:
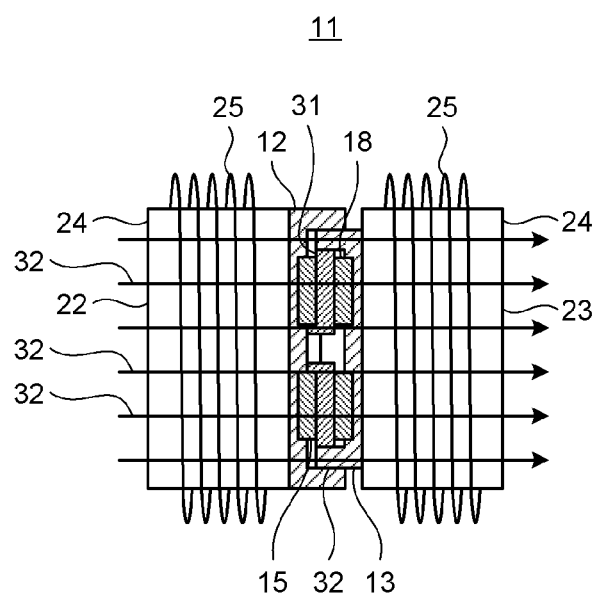
FIG. 10 is an exemplary diagram for explaining a case where a second transfer holder is moved to a magnetic transfer position in the first embodiment.

FIG. 9 is a diagram for explaining a case where the magnetic disk medium to be pre-formatted is installed at a standby position in the magnetic transfer device 11. FIG. 10 is a diagram for explaining a case where the second transfer holder 13 is moved to a magnetic transfer position.

In the first embodiment, the second transfer holder 13 is movable between a predetermined standby position and a magnetic transfer position. At the predetermined standby position, a predetermined distance is maintained between the first transfer holder 12 and the second transfer holder 13 as illustrated in FIG. 9. In that state, the magnetic disk medium 31 that is yet to be pre-formatted is attached to the magnetic disk bore shaft 16 of the first transfer holder 12.

On the other hand, if the second transfer holder 13 and the second electromagnet 23 move from the predetermined standby position toward the first transfer holder 12, then the first transfer holder 12 and the second transfer holder 13 fall into a coupled state at the predetermined magnetic transfer position as illustrated in FIG. 10. Consequently, inside the first transfer holder 12 and the second transfer holder 13, the magnetic disk medium 31 gets sandwiched between the first master medium 15 and the second master medium 18.

Described below is the case of performing pre-formatting to write a servo pattern on the magnetic disk medium 31. First, as illustrated in FIG. 9, in the state where the second transfer holder 13 and the second electromagnet 23 are at the predetermined standby state, the magnetic disk medium 31 having been is formatted is attached to the magnetic disk bore shaft 16 of the first transfer holder 12. As a result, the rear surface of the magnetic disk medium 31 gets superposed on the front surface of the first master medium 15.

Figure 11:
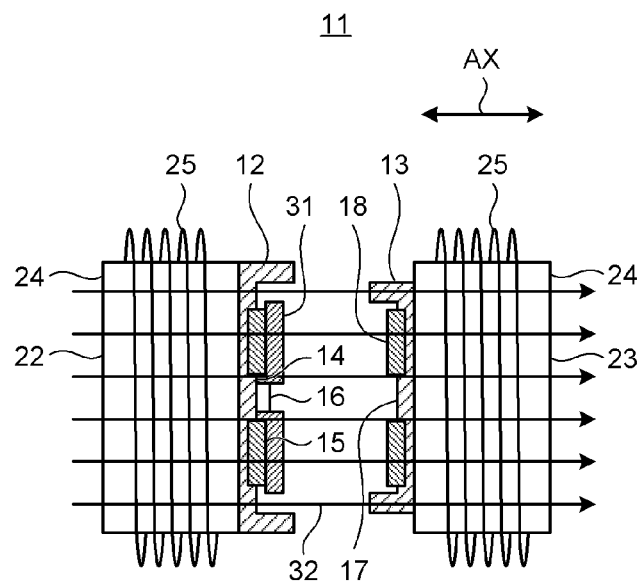
FIG. 11 is an diagram for explaining the operation if electric current is flown in a first electromagnet and a second electromagnet in the first embodiment.

FIG. 11 is a diagram for explaining the operation if electric current is flown in the first electromagnet 22 and the second electromagnet 23. The control circuit 26 starts the supply of electric currents to the first electromagnet 22 and the second electromagnet 23.

Once the first electromagnet 22 and the second electromagnet 23 are supplied with the electric currents, then, for example, magnetic field lines 32 are generated from the first electromagnet 22 to the second electromagnet 23 as illustrated in FIG. 11. This causes magnetic attraction between the first electromagnet 22 and the second electromagnet 23. Then, the second electromagnet 23 and the second transfer holder 13 move from the standby position toward the magnetic transfer position by the guidance of the guiding rail (not illustrated).

Subsequently, as illustrated in FIG. 10, the first transfer holder 12 and the second transfer holder 13 fall into a coupled state at the magnetic transfer position. That is, the first master medium 15 and the second master medium 18 sandwich therebetween the magnetic disk medium 31 and also get positioned in contact with both surfaces of the magnetic disk medium 31, respectively.

In that state, if the first electromagnet 22 and the second electromagnet 23 are continuously supplied with electric currents, the magnetic attraction is maintained between the first electromagnet 22 and the second electromagnet 23. Consequently, the front surface of the first master medium 15 gets attached closely to the rear surface of the magnetic disk medium 31. As a result, magnetic patterns of the first master medium 15 adhere to the rear surface of the magnetic disk medium 31. Then, due to the magnetic field lines 32, in the portion on the rear surface of the magnetic disk medium 31 to which the magnetic patterns of the first master medium 15 adhere, magnetization occurs in an overwriting manner. Thus, in the portion on the rear surface of the magnetic disk medium 31 to which the magnetic patterns adhere, magnetization occurs in the opposite orientation to the orientation of the magnetic field lines 32.

Similarly, the front surface of the second master medium 18 gets attached closely to the front surface of the magnetic disk medium 31. As a result, magnetic patterns of the second master medium 18 adhere to the front surface of the magnetic disk medium 31. Then, due to the magnetic field lines 32, in the portion on the front surface of the magnetic disk medium 31 to which the magnetic patterns of the second master medium 18 adhere, magnetization occurs in an overwriting manner. Thus, in the portion on the front surface of the magnetic disk medium 31 to which the magnetic patterns adhere, magnetization occurs in the opposite orientation to the orientation of the magnetic field lines 32. In this way, servo patterns are written to the front and rear surfaces of the magnetic disk medium 31.

After that, the control circuit 26 stops the supply of electric current to the first electromagnet 22 and the second electromagnet 23. That causes a loss of magnetic attraction between the first electromagnet 22 and the second electromagnet 23. As a result, the second transfer holder 13 and the first transfer holder 12 are freed from the coupled state, and the second transfer holder 13 becomes movable from the magnetic transfer position to the standby position. At this time, the first electromagnet 22 and the second electromagnet 23 may be supplied with electric current opposite to that in the case of coupling the first transfer holder 12 and the second transfer holder 13. With this, due to the magnetic repulsive force between the first electromagnet 22 and the second electromagnet 23, the second transfer holder 13 starts moving toward the standby position.

Thereafter, the magnetic disk medium 31 is taken out from the first transfer holder 12 either by an operator or by using a disk attaching-detaching device (not illustrated). Then, the new magnetic disk medium 31 having been formatted is attached to the magnetic disk bore shaft 16 either by an operator or by using the disk attaching-detaching device (not illustrated), and the magnetic transfer is repeated in the same manner.

As described above, in the magnetic transfer device 11 according to the first embodiment, sectors having the same sector number on the front and rear surfaces of the magnetic disk medium 31 are arranged at positions shifted by a predetermined angle. Alternatively, sectors are formed in a mirror symmetrical manner on the front and rear surfaces of the magnetic disk medium 31, and the sector numbers of the sectors formed at the same position are shifted by a predetermined number. With this simple configuration, not only the manufacturing cost of the magnetic disk medium 31 can be prevented from increasing, but also the magnetic disk medium 31 can be easily identified and subjected to error analysis and quality control on a transfer condition basis.

In the first embodiment described above, sectors having the same sector number on the front and rear surfaces of the magnetic disk medium 31 are arranged at positions shifted by a predetermined angle. Alternatively, in the first embodiment, sectors are formed in a mirror symmetrical manner on the front and rear surfaces of the magnetic disk medium 31, and the sector numbers of the sectors formed at the same position are shifted by a predetermined number.

In the first embodiment, to have the abovementioned configuration, the operator sets a shift at the time of fitting the first master medium 15 and the second master medium 18 to the first transfer holder 12 and the second transfer holder 13, respectively.

In contrast, according to a second embodiment, the first master medium 15 and the second master medium 18 are fit at predetermined reference fitting positions of the first transfer holder 12 and the second transfer holder 13, respectively, so that a shift amount can be set on the magnetic transfer device side.

Figure 12:
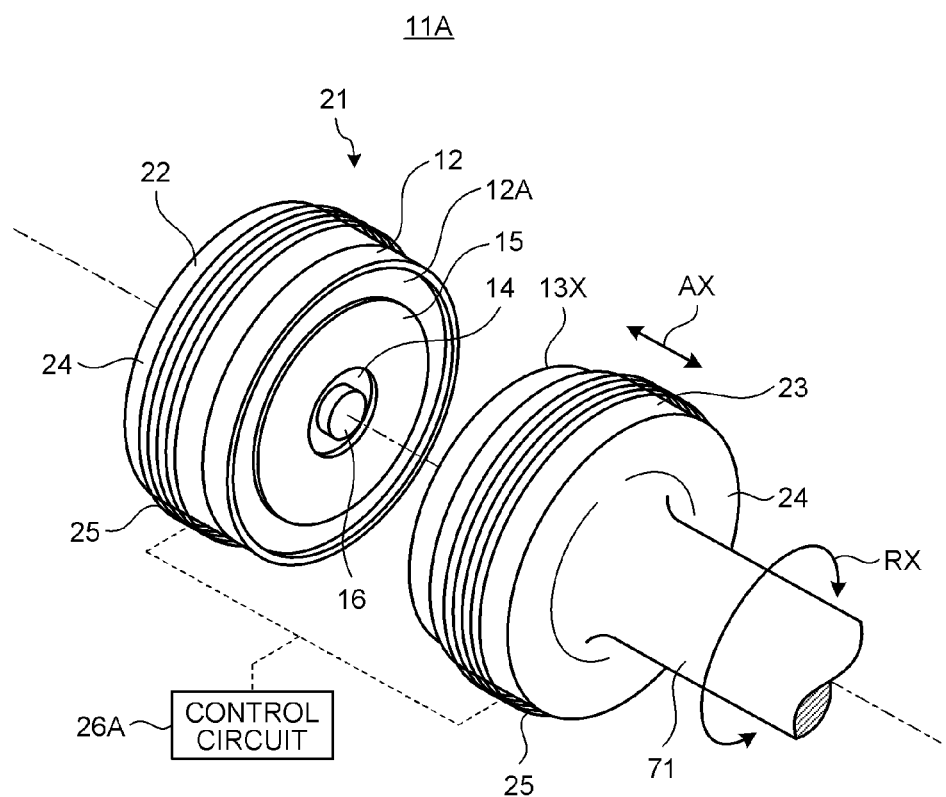
FIG. 12 is an exemplary schematic perspective view for explaining a magnetic transfer device according to a second embodiment.

FIG. 12 is a schematic perspective view for explaining a magnetic transfer device 11A according to the second embodiment. In FIG. 12, the constituent elements identical to those in the first embodiment are referred to by the same reference numbers, and the detailed explanation thereof is inherited from the above.

The magnetic transfer device 11A of the second embodiment differs from the magnetic transfer device 11 of the first embodiment in the following points. First, to a second transfer holder 13X, a rotation shaft 71 is connected at a preset rotating position in a fixedly holdable manner. Second, it is ensured that a desired amount of rotation is obtained for the second master medium 18, and that amount of rotation can be controlled by a control circuit 26A.

Figure 13:
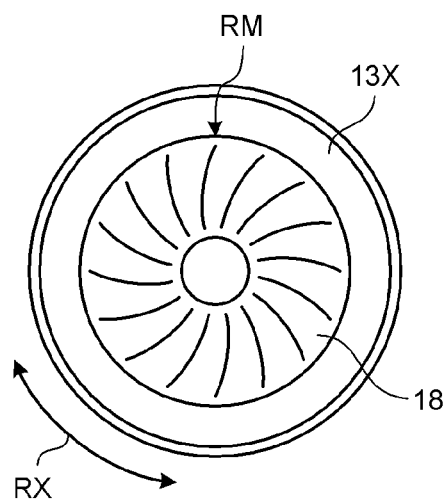
FIG. 13 is a front view of a second transfer holder in the second embodiment.

FIG. 13 is a front view of the second transfer holder of the second embodiment. As illustrated in FIG. 13, in this configuration, it is only required to align a position alignment mark (not illustrated) put on the edge or periphery of the second master medium 18 with a reference attachment position mark RM put on the second transfer holder 13X, and fit the second master medium 18 to the second transfer holder 13X. In this configuration, it is possible to set a desired rotation angle RX under the control of the control circuit 26A. Thus, if magnetic transfer is performed using the first master medium 15 and the second master medium 18 having the same structure and there is a change in the magnetic transfer conditions along the way or the like, it is possible to change the relative angle between the first master medium 15 and the second master medium 18.

This facilitates to arrange sectors having the same sector number on the front and rear surfaces of the magnetic disk medium 31 at positions shifted by a predetermined angle. Alternatively, sectors can be formed in a mirror symmetrical manner on the front and rear surfaces of the magnetic disk medium 31, and the sector numbers of the sectors formed at the same position can be easily shifted by a predetermined number.

Figure 14:
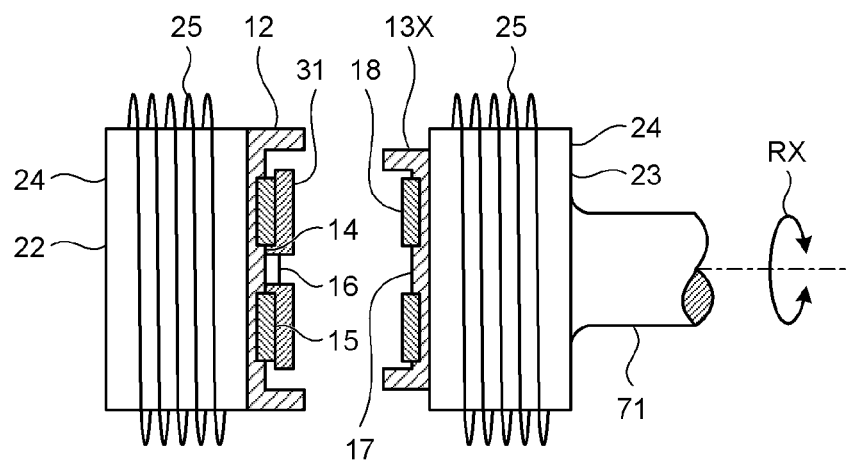
FIG. 14 is an diagram for explaining a case of changing the relative angle between a first master medium and a second master medium in the magnetic transfer device in the second embodiment.

FIG. 14 is a diagram for explaining a case of changing the relative angle between the first master medium 15 and the second master medium 18 in the magnetic transfer device 11A of the second embodiment. In the second embodiment, the second transfer holder 13X is not only capable of moving between the predetermined standby position and the magnetic transfer position in the direction indicated by the arrow AX but also capable of rotating in directions indicated by an arrow RX. Hence, at the predetermined standby position, during the state in which electric current to the first electromagnet 22 and the second electromagnet 23 is interrupted, if the control circuit 26A controls a driving device (not illustrated) to rotate the rotation shaft 71, the relative angle between the first master medium 15 and the second master medium 18 is changed and the rotating state is maintained.

Then, as illustrated in FIG. 14, the magnetic disk medium 31 that is yet to be pre-formatted is attached to the magnetic disk bore shaft 16 of the first transfer holder 12, and the second transfer holder 13X and the second electromagnet 23 are moved from the predetermined position toward the first transfer holder 12. Moreover, inside the first transfer holder 12 and the second transfer holder 13X, the magnetic disk medium 31 gets sandwiched between the first master medium 15 and the second master medium 18.

As a result, sectors having the same sector number on the front and rear surfaces of the magnetic disk medium 31 can be arranged at positions shifted by a predetermined angle. Alternatively, sectors can be formed in a mirror symmetrical manner on the front and rear surfaces of the magnetic disk medium 31, and the sector numbers of the sectors formed at the same position can be shifted by a predetermined number.

As described above, according to the second embodiment, in addition to the effects achieved in the first embodiment, it also becomes possible to change versions without difficulty.

In the above embodiments, positions for forming sector patterns are subjected to control. Alternatively, in a magnetic disk device, by applying a configuration for recording the last pattern to a master medium, the same operation as described above may be performed regarding seed patterns for rewriting used upon recording the last pattern.

In this case, if the seed patterns for rewriting get deleted upon rewriting, it is possible to perform version management until the rewriting. Even in the case where the seed patterns for rewriting are still present at the periphery of the magnetic disk medium after rewriting, those patterns can be read to perform version management even after rewriting.

In the above embodiments, an example is described in which information regarding versions is used as determination target information to be associated with sector offset values. However, it is also possible to use, in addition to information regarding versions, arbitrary information including information regarding transfer conditions such the electric field intensity during magnetic transfer, transfer machine ID information to identify transfer machines, and the like as determination target information, and associate it with sector offset values.

The control circuit 26 according to the above embodiments has the hardware configuration of a general computer comprising a control device such as a central processing unit (CPU), memory devices such as a read only memory (ROM) and a random access memory (RAM), external memory devices such as a hard disk drive (HDD) and a compact-disk (CD) drive, a display device such as a display, and input devices such as a keyboard and a mouse.

The control program executed in the control circuit 26 of the embodiments for performing version management or the like may be provided in the form of installable or executable files as being stored in a computer-readable storage medium such as a compact disk read only memory (CD-ROM), a flexible disk (FD), a compact disk recordable (CD-R), or a digital versatile disk (DVD).

The control program executed in the control circuit 26 of the embodiments may also be stored in a computer connected via the Internet so that it can be downloaded therefrom or may be provided or distributed through a network such as the Internet. Further, the control program of the embodiments may be provided as being stored in advance in ROM or the like.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk medium, configured to be pre-formatted on a plurality of surfaces by magnetic transfer, the medium comprising:
    a front surface comprising a first plurality of numbered sectors;
    a rear surface comprising a second plurality of numbered sectors,
    wherein sectors of the first plurality of numbered sectors are located at positions shifted by a first angle with respect to corresponding numbered sectors of the second plurality of numbered sectors, the first angle being associated with determination target information.

2. The magnetic disk medium of claim 1, wherein the first angle is n times an angle between two adjacent sectors on the front surface, n being a positive integer.

3. The magnetic disk medium of claim 1, wherein
    the determination target information indicates a version of magnetic transfer, and
    the first angle associated with the determination target information is based on the indicated version, the first angle being identical for identical versions, and different for different versions.

4. The magnetic disk medium of claim 1, wherein each sector number corresponds to a seed pattern.

5. The magnetic disk medium of claim 2, wherein:
    the determination target information indicates a version of magnetic transfer, and
    the first angle associated with the determination target information is based on the indicated version, the first angle being identical for identical versions, and different for different versions.

6. The magnetic disk medium of claim 2, wherein each sector number corresponds to a seed pattern.

7. The magnetic disk medium of claim 3, wherein each sector number corresponding to a seed pattern.

8. The magnetic disk medium of claim 5, wherein each sector number corresponding to a seed pattern.

9. A magnetic disk medium configured to be pre-formatted on a plurality of surfaces by magnetic transfer, the medium comprising:
    a front surface comprising a first plurality of numbered sectors;
    a rear surface comprising a second plurality of numbered sectors located at positions corresponding to the first plurality of numbered sectors,
    wherein a difference between sector numbers of the sectors at the corresponding positions is a first value associated with determination target information.

10. The magnetic disk medium of claim 9, wherein
    the determination target information indicates a version of magnetic transfer, and
    the first value associated with the determination target information is based on the indicated version, the first value being identical for identical versions, and different for different versions.

11. A magnetic transfer device comprising:
    a first transfer holder configured to hold a first master medium to perform magnetic transfer on a first surface of a magnetic disk medium;
    a second transfer holder configured to hold a second master medium to perform magnetic transfer on a second surface of the magnetic disk medium; and
    a holding mechanism configured to cause the first transfer holder and the second transfer holder to hold the first master medium and the second master medium, respectively, wherein sectors with an identical sector number on the first surface and the second surface of the magnetic disk medium are arranged at positions shifted by a first angle associated with determination target information, or to cause the first transfer holder and the second transfer holder to hold the first master medium and the second master medium, respectively, wherein sectors are arranged at corresponding positions on the first surface and the second surface of the magnetic disk medium, and a difference between sector numbers of the sectors at the corresponding positions is a first value associated with determination target information.

* * * * *